(12) United States Patent
Matsumura et al.

(10) Patent No.: US 11,678,174 B2
(45) Date of Patent: Jun. 13, 2023

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 86 days.

(21) Appl. No.: 17/263,376

(22) PCT Filed: Jul. 27, 2018

(86) PCT No.: PCT/JP2018/028343
§ 371 (c)(1),
(2) Date: Jan. 26, 2021

(87) PCT Pub. No.: WO2020/021725
PCT Pub. Date: Jan. 30, 2020

(65) Prior Publication Data
US 2021/0297850 A1   Sep. 23, 2021

(51) Int. Cl.
*H04W 24/10*   (2009.01)
*H04W 8/24*   (2009.01)
*H04B 7/06*   (2006.01)

(52) U.S. Cl.
CPC .......... *H04W 8/24* (2013.01); *H04B 7/0695* (2013.01); *H04W 24/10* (2013.01)

(58) Field of Classification Search
CPC ...... H04W 8/24; H04W 24/10; H04B 7/0695; H04B 7/0632; H04B 7/0645; H04B 7/063
See application file for complete search history.

(56) References Cited

U.S. PATENT DOCUMENTS

2019/0268787 A1* 8/2019 Guan .................. H04B 7/0628
2019/0386757 A1* 12/2019 Li ........................ H04W 24/10

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).
3GPP TSG RAN WG1 Meeting #91; R1-1720803 "Views on NR Beam Management" NTT Docomo; Reno, USA; Nov. 27-Dec. 1, 2017 (11 pages).
3GPP TSG RAN WG1 Meeting 91; R1-1720182 "Remaining details on beam management" CATT; Reno, USA; Nov. 27-Dec. 1, 2017 (11 pages).

(Continued)

*Primary Examiner* — Chuong A Ngo
(74) *Attorney, Agent, or Firm* — Osha Bergman Watanabe & Burton LLP

(57) ABSTRACT

A user terminal according to one aspect of the present disclosure includes: a transmitting section that transmits capability information indicating a first number being equal to or greater than 1; a receiving section that receives configuration information indicating a second number being equal to or greater than 1 and being equal to or less than the first number; and a control section that performs a report of a measurement value of the second number being obtained by measurement of a reference signal associated with a beam. According to one aspect of the present disclosure, the number of beams to be reported can be determined appropriately.

4 Claims, 10 Drawing Sheets

(56) References Cited

OTHER PUBLICATIONS

International Search Report issued in International Application No. PCT/JP2018/028343, dated Oct. 16, 2018 (3 pages).
Written Opinion issued in International Application No. PCT/JP2018/028343; dated Oct. 16, 2018 (3 pages).

* cited by examiner

USER TERMINAL AND RADIO COMMUNICATION METHOD

TECHNICAL FIELD

The present disclosure relates to a user terminal and a radio communication method in next-generation mobile communication systems.

BACKGROUND ART

In UMTS (Universal Mobile Telecommunications System) networks, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8 and Rel. 9), and so on, the specifications of LTE-A (LTE-Advanced and LTE Rel. 10 to Rel. 14) have been drafted.

Successor systems of LTE (also referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 15" (or later versions), and so on) are also under study.

In existing LTE systems (for example, LTE Rel. 8 to Rel. 14), a user terminal (UE (User Equipment)) periodically and/or aperiodically transmits channel state information (CSI) to a base station. The UE transmits the CSI by using an uplink control channel (PUCCH (Physical Uplink Control Channel)) and/or an uplink shared channel (PUSCH (Physical Uplink Shared Channel)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), a method of beam management (BM) has been under study. In the beam management, beam selection based on a beam report transmitted by the UE to the base station has been under study.

NR includes a case in which, based on at least one of UE capability signaling from the UE and the number of reports from the gNB, one or more signals for beam measurement may be measured, and one or more beam measurement results may be reported. If the UE fails to properly determine the number of beams to be reported, increase of overhead of the beam report, increase of power consumption of the UE, reduction of communication throughput, and the like may be caused.

In the light of this, the present disclosure has one object to provide a user terminal and a radio communication method capable of appropriately determining the number of beams to be reported.

Solution to Problem

A user terminal according to one aspect of the present disclosure includes: a transmitting section that transmits capability information indicating a first number being equal to or greater than 1; a receiving section that receives configuration information indicating a second number being equal to or greater than 1 and being equal to or less than the first number; and a control section that performs a report of a measurement value of the second number being obtained by measurement of a reference signal associated with a beam.

Advantageous Effects of Invention

According to one aspect of the present disclosure, the number of beams to be reported can be determined appropriately.

DESCRIPTION OF EMBODIMENTS (CSI)

Figure 1:
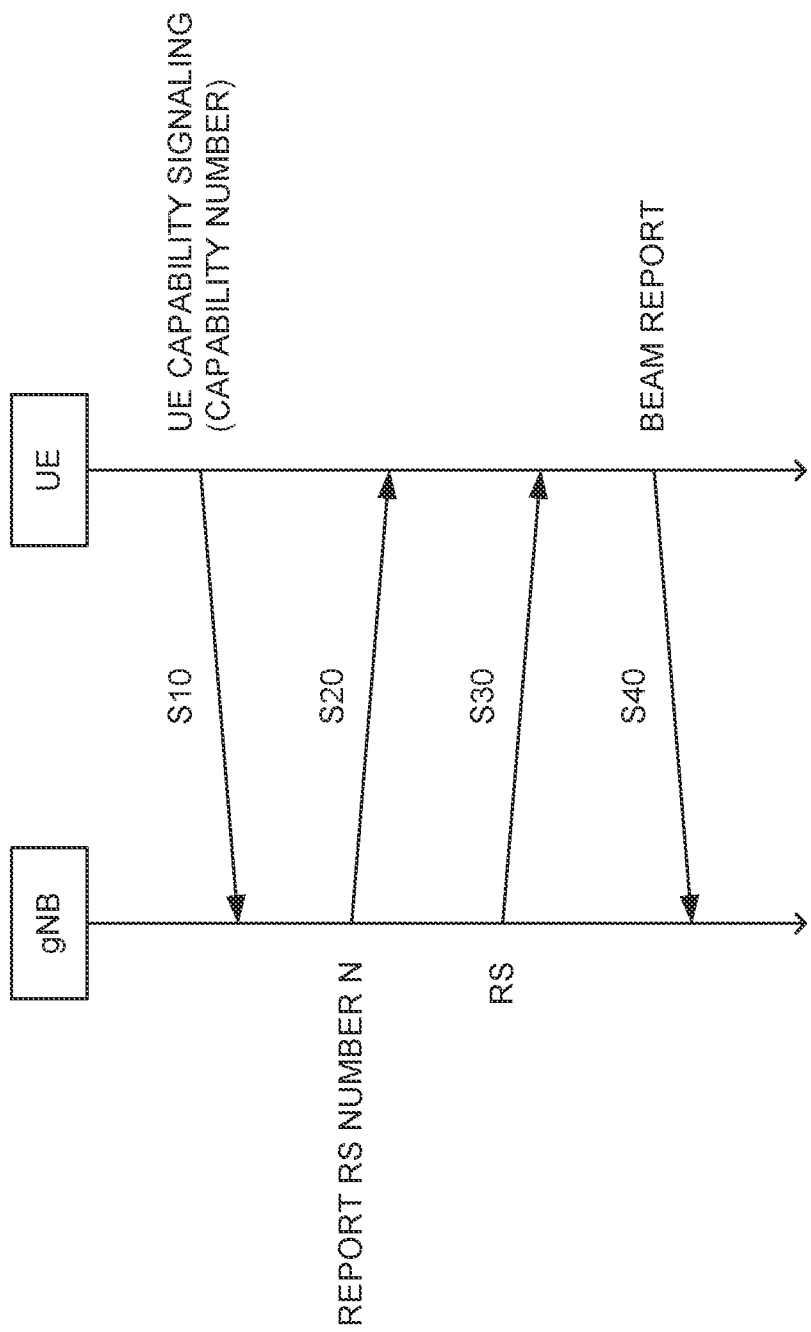
FIG. 1 is a diagram to show an example of operation of beam management.

In NR, the UE measures a channel state by using a certain reference signal (or a resource for the reference signal), and feeds back (reports) channel state information (CSI) to the base station.

The UE may measure the channel state by using a channel state information reference signal (CSI-RS), a synchronization signal/physical broadcast channel (SS/PBCH) block, a synchronization signal (SS), a demodulation reference signal (DMRS), or the like.

A CSI-RS resource may include at least one of a non zero power (NZP) CSI-RS and CSI-IM (Interference Management). The SS/PBCH block is a block including a synchronization signal (for example, a primary synchronization signal (PSS) and a secondary synchronization signal (SSS)), and a PBCH (and its corresponding DMRS), and may be referred to as an SS block or the like.

Note that the CSI may include at least one of a channel quality indicator (CQI), a precoding matrix indicator (PMI), a CSI-RS resource indicator (CRI), an SS/PBCH block resource indicator (SSBRI (SS/PBCH Block Indicator)), a layer indicator (LI), a rank indicator (RI), L1-RSRP (reference signal received power in layer 1 (Layer 1 Reference Signal Received Power)), L1-RSRQ (Reference Signal Received Quality), an L1-SINR (Signal to Interference plus Noise Ratio), an L1-SNR (Signal to Noise Ratio), and the like.

The CSI may include a plurality of parts. The first part of the CSI (CSI part 1) may include information (for example, the RI) having a relatively small number of bits. The second part of the CSI (CSI part 2) may include information (for example, the CQI) having a relatively large number of bits, such as information determined based on CSI part 1.

As a feedback method of the CSI, (1) a periodic CSI (P-CSI) report, (2) an aperiodic CSI (A-CSI) report, (3) a semi-persistent CSI report (SP-CSI (Semi-Persistent CSI)) report, and the like have been under study.

Information related to a resource for the report of the CSI of at least one of the P-CSI, the SP-CSI, and the A-CSI (which may be referred to as CSI report configuration information) may be reported to the UE by using higher layer signaling, physical layer signaling (for example, downlink control information (DCI)) or a combination of these.

Here, the higher layer signaling may be, for example, any one of RRC (Radio Resource Control) signaling, MAC (Medium Access Control) signaling, broadcast information, and so on, or a combination of these.

The MAC signaling may use, for example, a MAC control element (MAC CE), a MAC PDU (Protocol Data Unit), or the like. For example, the broadcast information may be master information blocks (MIBs), system information blocks (SIBs), minimum system information (RMSI (Remaining Minimum System Information)), other system information (OSI), and the like.

The CSI report configuration information may include, for example, information related to a report period, an offset, and the like, and these may be represented in a certain time unit (a slot unit, a subframe unit, a symbol unit, or the like). The CSI report configuration information may include a configuration ID (CSI-ReportConfigId), and a type of a CSI report method (whether or not it is SP-CSI, for example) and a parameter such as the report period may be identified using the configuration ID. The CSI report configuration information may include information (CSI-ResourceConfigId) indicating which reference signal (or resource for which reference signal) is used to report the measured CSI. (QCL/TCI)

In NR, the following has been under study: the UE controls reception processing (for example, demapping, demodulation, decoding, receive beamforming, and the like) and transmission processing (for example, mapping, modulation, coding, precoding, transmit beamforming, and the like) of the channel, based on information (QCL information) related to quasi-co-location (QCL) of the channel (for example, a downlink control channel (PDCCH (Physical Downlink Control Channel)), a PDSCH, a PUCCH, or the like).

Here, QCL is an indicator indicating statistical properties of the channel. For example, when a certain signal/channel and another signal/channel are in a relationship of QCL, it may be indicated that it is assumable that at least one of Doppler shift, a Doppler spread, an average delay, a delay spread, and a spatial parameter (for example, a spatial reception parameter (Spatial Rx Parameter)) is the same (QCL is established with respect to at least one of these) between such a plurality of different signals/channels.

Note that the spatial reception parameter may correspond to a receive beam of the UE (for example, a receive analog beam), and the beam may be identified based on spatial QCL. The QCL (or at least one element with QCL being established) in the present disclosure may be interpreted as sQCL (spatial QCL).

For the QCL, a plurality of types (QCL types) may be defined. For example, four QCL types A to D may be provided, which have different parameters (or parameter sets) that can be assumed to be the same, and such parameters are described below:

QCL type A: Doppler shift, Doppler spread, average delay, and delay spread
QCL type B: Doppler shift and Doppler spread
QCL type C: Average delay and Doppler shift
QCL type D: Spatial reception parameter A TCI state (TCI-state) may indicate (may include) QCL information. The TCI state (and/or the QCL information) may be, for example, information related to QCL between a channel as a target (or a reference signal (RS) for the channel) and another signal (for example, another downlink reference signal (DL-RS)), and may include, for example, at least one of information related to the DL-RS to be in a QCL relationship (DL-RS-related information) and information (QCL type information) indicating the QCL type.

The DL-RS-related information may include at least one of information indicating the DL-RS to be in a QCL relationship and information indicating a resource of the DL-RS. For example, when a plurality of reference signal sets (RS sets) are configured for the UE, the DL-RS-related information may indicate at least one of the DL-RS having a QCL relationship with a channel (or a port for the channel) out of the RSs included in the RS sets, a resource for the DL-RS, and the like.

Here, at least one of the RS for the channel and the DL-RS may be at least one of a synchronization signal, a PBCH, an SS/PBCH block, a CSI-RS, a DMRS, a mobility reference signal (MRS (Mobility RS)), a beam-specific signal, and the like, or a signal configured by, for example, enhancing or modifying these (for example, a signal configured by modifying at least one of density and a period).

Information related to the QCL between the PDCCH (or a DMRS antenna port related to the PDCCH) and a certain DL-RS may be referred to as a TCI state for the PDCCH or the like.

The UE may determine the TCI state for a UE-specific PDCCH (CORESET), based on RRC signaling and the MAC CE.

For example, one or a plurality of (K) TCI states may be configured for the UE for each CORESET by using higher layer signaling (ControlResourceSet information element). The UE may activate each of the one or a plurality of TCI states for each CORESET by using the MAC CE. The MAC CE may be referred to as a TCI state indication MAC CE for UE-specific PDCCH (TCI State Indication for UE-specific PDCCH MAC CE). The UE may perform monitoring of the CORESET, based on an active TCI state corresponding to the CORESET.

The TCI state may correspond to a beam. For example, the UE may assume that the PDCCHs of different TCI states are transmitted by using different beams.

Information related to the QCL between the PDSCH (or a DMRS antenna port related to the PDSCH) and a certain DL-RS may be referred to as a TCI state for the PDSCH or the like.

M (M≥1) TCI states for the PDSCH (M pieces of QCL information for the PDSCH) may be reported to (configured for) the UE by using higher layer signaling. Note that the number M of TCI states configured for the UE may be restricted by at least one of UE capability and the QCL type.

The DCI used for scheduling of the PDSCH may include a certain field indicating the TCI state (QCL information for the PDSCH) (which may be referred to as, for example, a field for the TCI, a TCI field, a TCI state field, or the like). The DCI may be used for scheduling of the PDSCH of a single cell, and may be referred to as, for example, DL DCI, DL assignment, DCI format 1_0, DCI format 1_1, or the like.

When the DCI includes a TCI field of x bits (for example, x=3), the base station may configure a maximum of $2^x$ (8 when x=3, for example) types of TCI states for the UE in advance by using higher layer signaling. The value of the TCI field (TCI field value) in the DCI may indicate one of the TCI states configured in advance by using higher layer signaling.

When more than eight types of TCI states are configured for the UE, eight or less types of TCI states may be activated (or specified) by using the MAC CE. The MAC CE may be referred to as a TCI state activation/deactivation MAC CE for a UE-specific PDSCH (TCI States Activation/Deactivation for UE-specific PDSCH MAC CE). The value of the TCI field in the DCI may indicate one of the TCI states activated by using the MAC CE.

The UE may determine the QCL of the PDSCH (or a DMRS port of the PDSCH), based on the TCI state indicated by the TCI field value in the DCI. For example, the UE may control reception processing of the PDSCH (for example, decoding, demodulation, and the like), assuming that the DMRS port (or a DMRS port group) of the PDSCH of a serving cell is in QCL with the DL-RS corresponding to the TCI state reported by using the DCI.

Regarding the PUCCH, what corresponds to the TCI state may be expressed as spatial relation. In Rel-15 NR, spatial relation information between a certain RS and the PUCCH can be included in PUCCH configuration information (PUCCH-Config information element) of RRC. The certain RS is at least one of an SSB, a CSI-RS, and a reference signal for measurement (SRS (Sounding Reference Signal)).

When the spatial relation information related to the SSB or the CSI-RS and the PUCCH is configured, the UE may transmit the PUCCH by using a spatial domain filter the same as the spatial domain filter for reception of the SSB or the CSI-RS. In other words, in this case, the UE may assume that a UE receive beam of the SSB or the CSI-RS and a UE transmit beam of the PUCCH are the same.

When the spatial relation information related to the SRS and the PUCCH is configured, the UE may transmit the PUCCH by using a spatial domain filter the same as the spatial domain filter for transmission of the SRS. In other words, in this case, the UE may assume that a UE transmit beam of the SRS and a UE transmit beam of the PUCCH are the same.

When more than one piece of spatial relation information related to the PUCCH is configured, control is performed so that a single PUCCH spatial relation is activated for a single PUCCH resource at certain time, by using PUCCH spatial relation activation/deactivation MAC CE.

The MAC CE may include information such as a serving cell ID, a BWP ID, and a PUCCH resource ID to be applied.

Note that a spatial domain filter for transmission of the base station, a downlink spatial domain transmission filter, and a transmit beam of the base station may be interpreted interchangeably. A spatial domain filter for reception of the base station, an uplink spatial domain receive filter, and a receive beam of the base station may be interpreted interchangeably.

A spatial domain filter for transmission of the UE, an uplink spatial domain transmission filter, and a transmit beam of the UE may be interpreted interchangeably. A spatial domain filter for reception of the UE, a downlink spatial domain receive filter, and a receive beam of the UE may be interpreted interchangeably.

(Beam Management)

Incidentally, thus far, in Rel-15 NR, a method of beam management (BM) has been under study. In the beam management, an operation in which beam selection is performed based on L1-RSRP reported by the UE has been under study. "To change (switch) the beams of a certain signal/channel" corresponds to "to change the TCI states (QCL) of the signal/channel,"

Note that the beam selected in beam selection may be a transmit beam (Tx beam) or may be a receive beam (Rx beam). The beam selected in beam selection may be a beam of the UE or may be a beam of the base station.

The UE may report (transmit) measurement results for the beam management by using the PUCCH or the PUSCH. In the PUCCH or the PUSCH, the UE may report the measurement results by using data (UCI or UL data), may report the measurement results by using selection of a resource, or may report the measurement results by using sequence selection. A sequence used for the sequence selection may be at least one of a DMRS sequence, a sequence transmitted on the PUCCH, or a sequence multiplied to data (UL data or UCI). The measurement results may be, for example, the CSI including at least one of the L1-RSRP, the L1-RSRQ, the L1-SINR, the L1-SNR, and the like. The measurement results may be referred to as beam measurement, beam measurement results, a beam report, a beam measurement report, or the like.

CSI measurement for the beam report may include interference measurement. The UE may derive the beam report by measuring channel quality, interference, or the like by using a resource for CSI measurement. The resource for CSI measurement may be, for example, at least one of a resource of the SS/PBCH block, a resource of the CSI-RS, another reference signal resource, and the like. Configuration information of a CSI measurement report may be configured for the UE by using higher layer signaling.

In the beam report, results of at least one of the channel quality measurement and the interference measurement may be included. The results of the channel quality measurement may include, for example, the L1-RSRP. The results of the interference measurement may include the L1-SINR, the L1-SNR, the L1-RSRQ, another indicator related to interference (for example, any indicator other than the L1-RSRP), or the like.

Note that the resource for CSI measurement for beam management may be referred to as a resource for beam measurement. A signal/channel of the CSI measurement target may be referred to as a signal for beam measurement. The CSI measurement/report may be interpreted as at least one of a measurement/report for beam management, a beam measurement/report, a radio link quality measurement/report, and the like.

The configuration information of the CSI measurement (for example, CSI-MeasConfig or CSI-ResourceConfig) may include information such as one or more non zero power (NZP) CSI-RS resource sets (NZP-CSI-RS-ResourceSet) for CSI measurement, one or more zero power (ZP) CSI-RS resource sets (ZP-CSI-RS-ResourceSet) (or CSI-IM (Interference Management) resource sets (CSI-IM-ResourceSet)), and one or more SS/PBCH block resource sets (CSI-SSB-ResourceSet).

Information of each resource set may include information related to repetition in the resources in the resource set. The information related to the repetition may indicate, for example, 'on' or 'off.' Note that 'on' may be expressed as 'enabled (or valid),' and 'off' may be expressed as 'disabled (or invalid).'

For example, regarding the resource set in which the repetition is configured to be 'on,' the UE may assume that the resources in the resource set are transmitted by using the same downlink spatial domain transmission filter. In this case, the UE may assume that the resources in the resource set are transmitted by using the same beam (for example, by using the same beam from the same base station).

Regarding the resource set in which the repetition is configured to be 'off,' the UE may perform control that the UE must not assume (or need not assume) that the resources in the resource set are transmitted by using the same downlink spatial domain transmission filter. In this case, the UE may assume that the resources in the resource set are not transmitted by using the same beam (are transmitted by using a different beam). In other words, regarding the resource set in which the repetition is configured to be 'off,' the UE may assume that the base station performs beam sweeping.

Incidentally, in NR, a configuration of including a plurality of measurement results in the beam report has been under study. The following has been under study: the UE measures a maximum of 64 beams, and reports a configured number of beams in a single report instance.

The following has been under study: the UE for which a group-based beam report is configured to be enabled by using a higher layer parameter (for example, an RRC parameter "groupBasedBeamReporting") includes a plurality of resource IDs for beam measurement (for example, SSBRIs and CRIs) and a plurality of measurement results (for example, the L1-RSRP) corresponding to these in the beam report for each report configuration.

The following has been under study: the UE for which one or more report target RS resource numbers are configured by using a higher layer parameter (for example, an RRC parameter "nrofReportedRS") includes one or more resource IDs for beam measurement and one or more measurement results (for example, the L1-RSRP) corresponding to these in the beam report for each report configuration.

The following has been under study: the UE reports that the UE supports a non-group-based beam report (non-group based beam reporting) using a report of N_max RSRP values as UE capability signaling, a set of candidate values is 1, 2, and 4, and these features are defined in a UE feature list.

At the same time, the following has been under study: the report RS number (nrofReportedRS) indicates the number N of measured RS resources per report configuration in the non-group-based report, N is equal to or less than a report RS maximum number N_max, and N_max is 2 or 4 depending on the UE capability.

However, how the UE determines the beam report for UE capability signaling has not yet been made clear. For example, how the UE determines N_max when the UE reports any one of 1, 2, and 4 as the UE capability signaling and how the UE determines N_max when the UE reports 1 as the UE capability signaling have not yet been made clear.

The beam report has large overhead. Accordingly, increase of power consumption of the UE, reduction of communication throughput, and the like may pose problems.

In the light of this, the inventors of the present invention came up with the idea of a method in which the UE determines the beam report, based on at least one of the UE capability signaling and the report RS number N.

In the following, embodiments according to the present disclosure will be described in detail with reference to the drawings. The radio communication method according to each embodiment may be applied individually, or may be applied in combination.

Note that, in the present disclosure, "to assume" may signify that reception processing, transmission processing, measurement processing, and the like are performed by assuming.

The present disclosure will mainly describe a case in which the UE reports a measurement value of the L1-RSRP of the beam (RS). However, the L1-RSRP may be interpreted as the L1-SINR, the L1-SNR, the L1-RSRQ, the interference, or a combination of those.

The best beam out of a plurality of beams may be a beam whose measurement value (power, a ratio, or the like) of at least one of the L1-RSRP, the L1-SINR, the L1-SNR, and the L1-RSRQ has a maximum value, or may be a beam whose measurement value (power, a ratio, or the like) of the interference has a minimum value.

(Radio Communication Method)

<Aspect 1>

In aspect 1, as shown in FIG. 1, the UE reports one (capability number) of the set of candidate values of 1, 2, and 4 by using UE capability signaling (S10), and assumes that the report RS number N configured by using higher layer signaling is equal to or less than the value reported by using the UE capability signaling (S20). The UE may assume that the report RS maximum number N_max is 1, 2, or 4 depending on the UE capability. The UE may assume that the reported value that is reported by using the UE capability signaling is N_max.

Subsequently, the UE measures a plurality of RSs corresponding to a plurality of respective base station transmit beams (S30), and transmits a beam report including the N highest measurement values (S40).

The gNB may configure N from 1 to N_max for the UE. The UE may assume that N is a value from 1 to N_max.

The gNB may configure N_max as N for the UE. The UE may assume that N is equal to N_max.

The minimum value of the capability number is 1, and thus the gNB may invariably configure N to 1. The UE may assume that N is invariably 1 regardless of the capability number. The UE may assume that N_max and N are invariably 1 regardless of the capability number. When the beam selected by the gNB is reported by using higher layer signaling, the gNB configures a single beam for the UE, and hence N may be invariably 1. In this case, the UE only needs to report the measurement value of the single beam, and thus overhead of the beam report can be reduced.

When the beam is configured for the UE by using the MAC CE, the UE need not assume that N is invariably 1.

According to aspect 1 described above, the UE can clearly determine at least one of N_max and N. Therefore, UE operation is made clear.

<Aspect 2>

In aspect 2, the number of bits of the report of the measurement value of the best beam is different between a case in which the UE reports the measurement value of one beam (RS) and a case in which the UE reports the measurement value of more than one beam (RS) in the non-group-based beam report.

The case in which the UE reports the measurement value of one beam may be a case in which the report RS number N is configured to 1, or may be a case in which at least one of the capability number and N_max is 1. The case in which the UE reports the measurement value of more than one beam may be a case in which the report RS number N is configured to a number that is greater than 1, or may be a case in which at least one of the capability number and N_max is greater than 1.

Regarding the number of bits of the measurement value of the best beam in the report of the measurement value of one beam and the number of bits of the measurement value of the best beam in the report of the measurement value of more than one beam, the UE may follow one of the following aspects 2-1 and 2-2.

<<Aspect 2-1>>

The number of bits of the measurement value of the best beam in the report of the measurement value of one beam may be smaller than the number of bits of the measurement value of the best beam in the report of the measurement value of more than one beam.

Figure 2A:
FIG. 2A and FIG. 2B are each a diagram to show an example of the number of bits of a report of a measurement value.
Figure 2A:
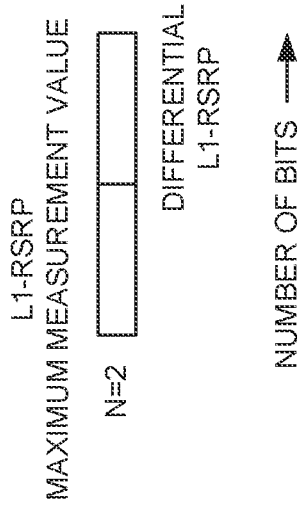

For example, as shown in FIG. 2A, when N is configured to greater than 1, the UE may quantize a maximum measurement value of the L1-RSRP to 7 bits and may quantize differential L1-RSRP to 4 bits. The UE may calculate the differential L1-RSRP, with the maximum measurement value of the L1-RSRP being used as a reference. The UE may calculate the differential L1-RSRP for the measurement values whose L1-RSRP is the second or lower value.

On the other hand, when N is configured to 1, the UE may quantize the maximum measurement value of the L1-RSRP to the number of bits (for example, 6, 5, 4, or the like) that is smaller than 7 bits.

When N is configured to 1, the gNB can be informed of the best beam. Thus, even when the number of bits of the maximum measurement value of the L1-RSRP is reduced, influence on performance can be reduced. When N is configured to greater than 1, a large number of resources are secured for the payload of the UCI, and thus the influence of the number of bits of the beam report is small.

<<Aspect 2-2>>

The number of bits of the measurement value of the best beam in the report of the measurement value of more than one beam may be smaller than the number of bits of the measurement value of the best beam in the report of the measurement value of one beam.

For example, when N is configured to 1, the UE may quantize the maximum measurement value of the L1-RSRP to 7 bits.

On the other hand, when N is configured to greater than 1, the UE may quantize the maximum measurement value of the L1-RSRP to the number of bits (for example, 6, 5, 4, or the like) that is smaller than 7 bits.

Figure 2B:
Figure 2B:
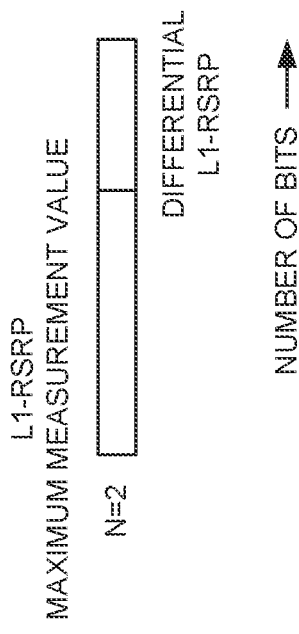

When N is configured to greater than 1, the number of bits of the maximum measurement value of the L1-RSRP may be equal to the number of bits of the differential L1-RSRP. For example, as shown in FIG. 2B, when N is configured to 2, the UE may quantize the maximum measurement value of the L1-RSRP to 4 bits and may quantize the differential L1-RSRP to 4 bits.

The number of bits obtained by adding up the maximum measurement value of the L1-RSRP and the differential L1-RSRP when N is configured to 2 may be equal to the number of bits of the maximum measurement value of the L1-RSRP when N is configured to 1. For example, the number of bits obtained by adding up the maximum measurement value of the L1-RSRP and the differential L1-RSRP when N is configured to 2 may be 7 bits.

When N is configured to greater than 1, the gNB can be informed of a relative relationship between a beam whose measurement value is the best and a beam whose measurement value is the second or lower. Thus, even when the number of bits of the maximum measurement value of the L1-RSRP is reduced, influence on performance can be reduced.

According to aspect 2 described above, the second number of bits can be reduced while reducing influence on performance. In this manner, overhead of the beam report can be reduced.

<Aspect 3>

In aspect 3, a specific method of reducing the number of bits of the report of the measurement value of the best beam from the first number of bits to the second number of bits will be described. In aspect 2, one of the number of bits of the measurement value of the best beam in the report of the measurement value of one beam and the number of bits of the measurement value of the best beam in the report of the measurement value of more than one beam may be the first number of bits, and the other may be the second number of bits.

The UE may reduce the number of bits of the report of the measurement value of the best beam in accordance with the following aspects 3-1 and 3-2 or a combination of those.

<<Aspect 3-1>>

By narrowing the range of the measurement value of the best beam, the number of bits of the report of the measurement value of the best beam is reduced.

When the report of the measurement value of the best beam has the first number of bits, the UE may quantize the measurement value to a value within the first range. For example, the lower limit value of the first range is −140 dBm, and the upper limit value of the first range is −44 dBm. Note that the first range is not limited to the range described above.

The second range that is used when the report of the measurement value of the best beam has the second number of bits is obtained by changing at least one of the upper limit value and the lower limit value of the first range, and is narrower than the first range.

The UE may use the second range in accordance with one of the following aspects 3-1-1, 3-1-2, 3-1-3, and 3-1-4.

<<Aspect 3-1-1>>

Figure 3:
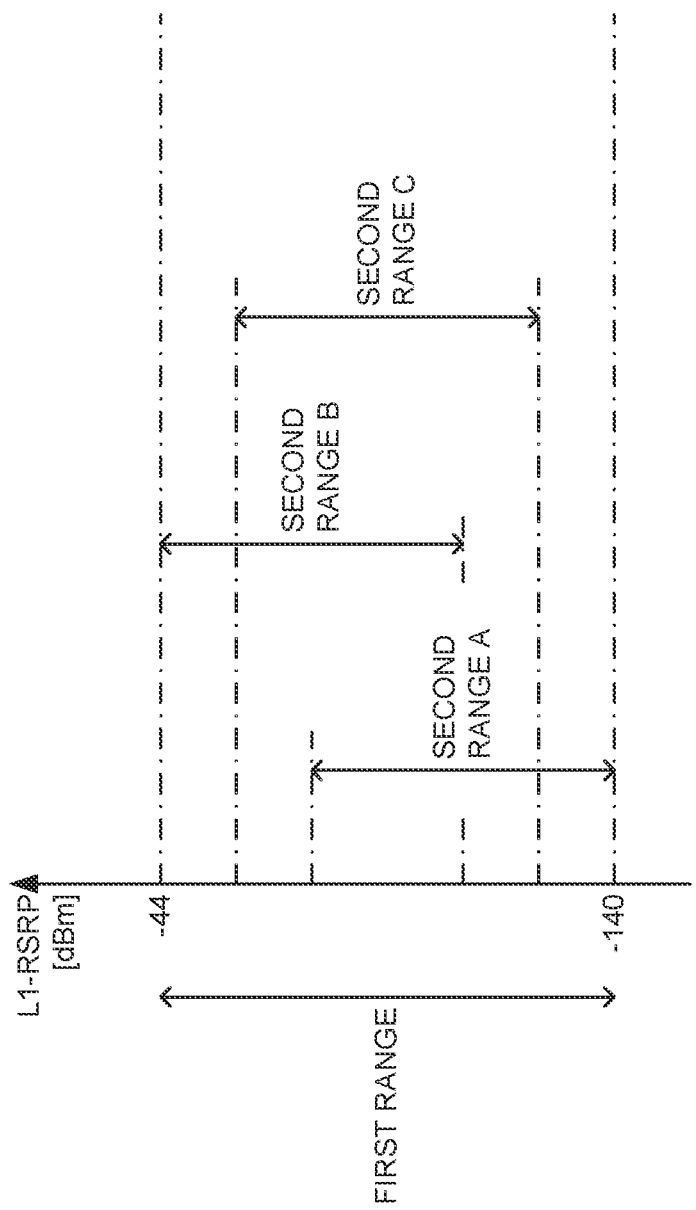
FIG. 3 is a diagram to show an example of ranges of the measurement value.

The upper limit value of the second range is smaller than the upper limit value of the first range (second range A of FIG. 3).

The gNB can select an appropriate beam on the condition that the gNB is able to be informed of a beam that has the measurement value of a certain value (for example, −50 dBm, −60 dBm, or the like) or higher. Thus, the upper limit value of the second range may be lowered to the certain value. In this case, even if the UE reports that the measurement value of the best beam exceeds the upper limit value (is out of range), the gNB can be informed of a beam that has the measurement value of the certain value or higher and can thus select the beam. Consequently, influence on performance can be reduced while reducing the second number of bits.

<<Aspect 3-1-2>>

The lower limit value of the second range is larger than the lower limit value of the first range (second range B of FIG. 3).

It can be assumed that it is rare to report measurement values around the lower limit value because the beam report reports a certain number of the highest beams. Thus, even when the lower limit value of the second range is made larger than the lower limit value of the first range, influence on performance is small.

<<Aspect 3-1-3>>

The upper limit value of the second range is smaller than the upper limit value of the first range, and the lower limit value of the second range is larger than the lower limit value of the first range (second range C of FIG. 3).

It can be assumed that the probability that the measurement value is located around the center of the first range is high. Thus, even if the second range is narrowed down to a range around the center of the first range, it can be assumed that the probability that the range goes out of the range is low. Consequently, influence on performance can be reduced while reducing the second number of bits.

<<Aspect 3-1-4>>

For the UE, information indicating at least one of the first range and the second range may be configured by using higher layer signaling (for example, RRC signaling).

The higher layer signaling may be information (index of a candidate or the like) indicating one of a plurality of candidates within a range configured in advance.

For the UE, at least one of the upper limit value and the lower limit value of the second range may be configured by using higher layer signaling. For example, the upper limit value of the second range may be configured for the UE, and the UE may determine the lower limit value, based on a step size configured in advance and the upper limit value.

<<Aspect 3-2>>

By widening the step size of the measurement value of the best beam, the number of bits of the report of the measurement value of the best beam is reduced.

When the report of the measurement value of the best beam has the first number of bits, the UE may quantize the measurement value by using the first step size. For example, the first step size is 1 dB. Note that the first step size is not limited to the value described above.

Figure 4:
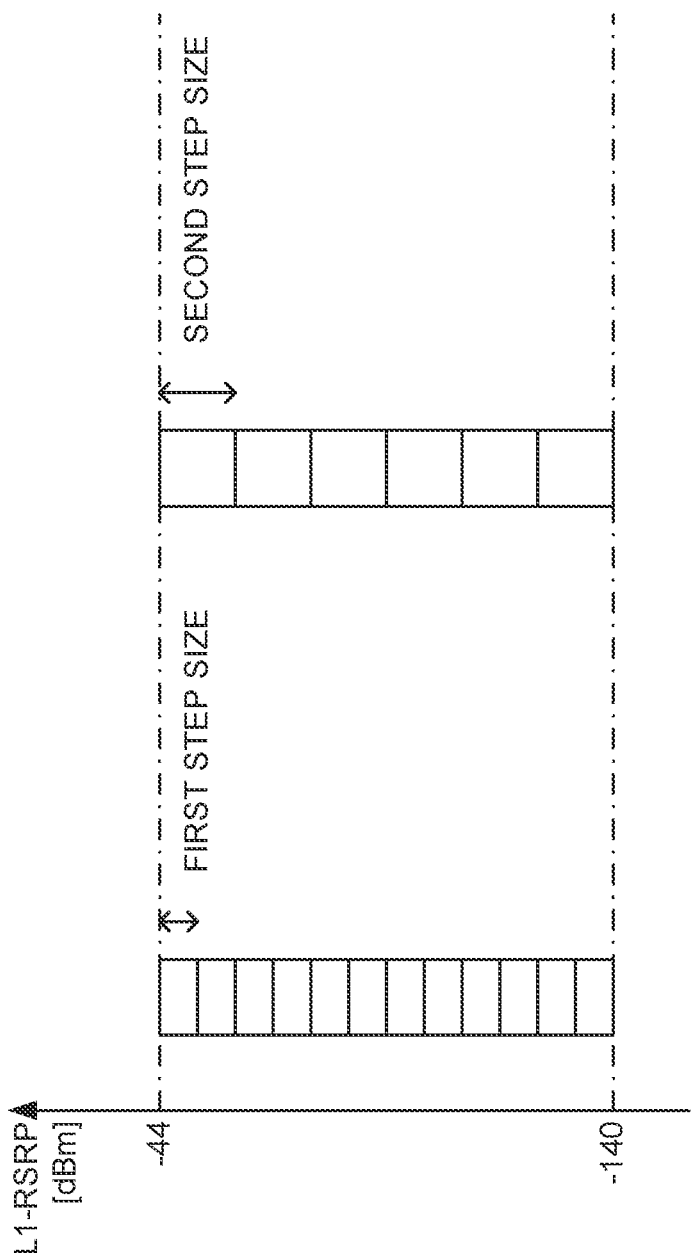
FIG. 4 is a diagram to show an example of step sizes of the measurement value.

When the report of the measurement value of the best beam has the second number of bits, the UE may quantize the measurement value by using the second step size that is larger than the first step size (FIG. 4). For example, the second step size is 2, 3, or 4 dB, or the like. Note that the second step size is not limited to the value described above.

According to aspect 3 described above, the second number of bits can be reduced while reducing influence on performance. In this manner, overhead of the beam report can be reduced.

<Aspect 4>

For the UE, whether or not the second number of bits is applied to the report of the measurement value of the best beam may be configured by using higher layer signaling (for example, RRC signaling). In other words, for the UE, whether or not the number of bits of the report of the measurement value of the best beam is different between a case in which the UE reports the measurement value of one beam (RS) and a case in which the UE reports the measurement value of more than one beam (RS) in the non-group-based beam report may be configured by using higher layer signaling. The second number of bits may be based on aspect 2 or aspects 2 and 3.

When the application of the second number of bits is configured, the UE may apply a value configured in advance as the second number of bits, or may apply a value configured by using higher layer signaling as the second number of bits.

According to aspect 4, the second number of bits can be configured flexibly according to a communication condition, measurement results of a beam, resources allocated to a beam report, and the like.

<Aspect 5>

In the following, information included in the beam report according to the present disclosure will be described.

When the UE reports at least one of the L1-RSRP, the L1-RSRQ, the L1-SINR, and the results of the channel quality measurement, the UE may report a certain number of the largest values (a certain number of values in descending order from the largest value). When the UE reports at least one of the results of the interference measurement, the UE may report a certain number of the smallest values (a certain number of values in ascending order from the smallest value). Note that, when a plurality of values are included in the UCI, one value and a difference between the one value and another value may be included.

Information related to the certain number may be reported to the UE by using higher layer signaling, physical layer signaling, or a combination of these. The certain number may be, for example, 1, 2, 4, or the like. Regarding the certain number, different values may be configured for the report of the channel quality measurement and the report of the interference measurement.

The UE may report a beam index, a resource ID for beam measurement (for example, an SSBRI or a CRI), or an index of a signal for beam measurement (for example, an SSB index or a CSI-RS ID) that corresponds to at least one of a certain number of the largest L1-RSRPs, L1-RSRQs, L1-SINRs, and results of the channel quality measurement.

The UE may report a beam index, a resource ID for beam measurement (for example, an SSBRI or a CRI), or an index of a signal for beam measurement (for example, an SSB index or a CSI-RS ID) that corresponds to at least one of a certain number of the smallest results of the interference measurement.

Note that the "certain number of the largest values" described above may be interpreted as "values whose measurement results are equal to or higher than a threshold," a "certain number of the largest values whose measurement results are equal to or higher than a threshold," or the like. The "certain number of the smallest values" described above may be interpreted as "values whose measurement results are less than a threshold," a "certain number of the largest values whose measurement results are less than a threshold," or the like. The threshold herein may be configured by using higher layer signaling, or may be determined in a specification.

The threshold for the measurement results may be configured for the UE by using higher layer signaling, or may be defined in a specification. The UE may select a beam having the best second measurement results out of the beams whose first measurement results satisfy a condition of the threshold and report the beam. The UE may select X beams in descending order from the beam having the largest second measurement results out of the beams whose first measurement results satisfy a condition of the threshold and report the X beams. For example, the UE may select X beams in descending order from the beam having the largest L1-RSRP out of the beams whose interference is lower than the threshold.

When the UE reports more than one measurement result to the base station, how the base station determines the beam for the UE may depend upon implementation of the base station.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 5:
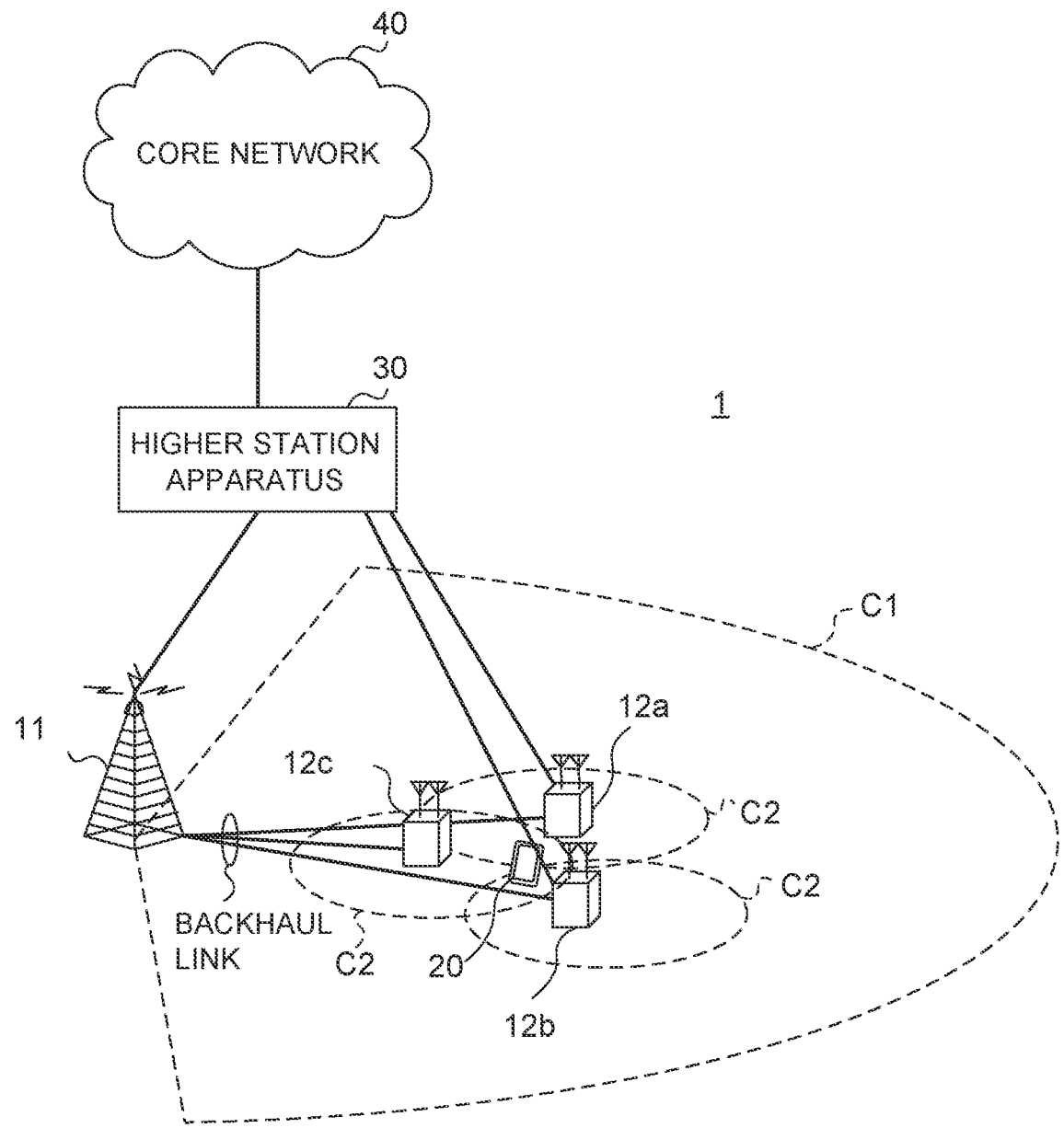
FIG. 5 is a diagram to show an example of a schematic structure of a radio communication system according to one embodiment.

FIG. 5 is a diagram to show an example of a schematic structure of the radio communication system according to one embodiment. A radio communication system 1 can adopt at least one of carrier aggregation (CA) and dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a base station 11 that forms a macro cell C1 of a relatively wide coverage, and base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the base station 11 and the base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the base stations 12, a carrier of a relatively high frequency band (for example, 3.5 GHz, 5 GHz, and so on) and a wide bandwidth may be used, or the same carrier as that used between the user terminals 20 and the base station 11 may be used. Note that the structure of the frequency band for use in each base station is by no means limited to these.

The user terminals 20 can perform communication by using at least one of time division duplex (TDD) and frequency division duplex (FDD) in each cell. Furthermore, in each cell (carrier), a single numerology may be employed, or a plurality of different numerologies may be employed.

Numerologies may be communication parameters applied to at least one of transmission and reception of a certain signal and channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on.

For example, when at least one of the subcarrier spacing of constituting OFDM symbols and the number of OFDM symbols is different regarding certain physical channels, this case may be described that numerologies are different.

A wired connection (for example, means in compliance with the CPRI (Common Public Radio Interface) such as an optical fiber, an X2 interface and so on) or a wireless connection may be established between the base station 11 and the base stations 12 (or between two base stations 12).

The base station 11 and the base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each base station 12 may be connected with the higher station apparatus 30 via the base station 11.

Note that the base station 11 is a base station having a relatively wide coverage, and may be referred to as a "macro base station," a "central node," an "eNB (eNodeB)," a "transmitting/receiving point" and so on. The base stations 12 are base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the base stations 11 and 12 will be collectively referred to as "base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and at least one of single carrier frequency division multiple access (SC-FDMA) and OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink control channels and so on, are used as downlink channels. User data, higher layer control information, SIBs (System Information Blocks) and so on are communicated on the PDSCH. The MIBs (Master Information Blocks) are communicated on the PBCH.

The downlink control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including scheduling information of at least one of the PDSCH and PUSCH, and so on are communicated on the PDCCH.

Note that the DCI scheduling DL data reception may be referred to as "DL assignment," and the DCI scheduling UL data transmission may be referred to as "UL grant."

The number of OFDM symbols to use for the PDCCH may be communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH may be transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Base Station)

Figure 6:
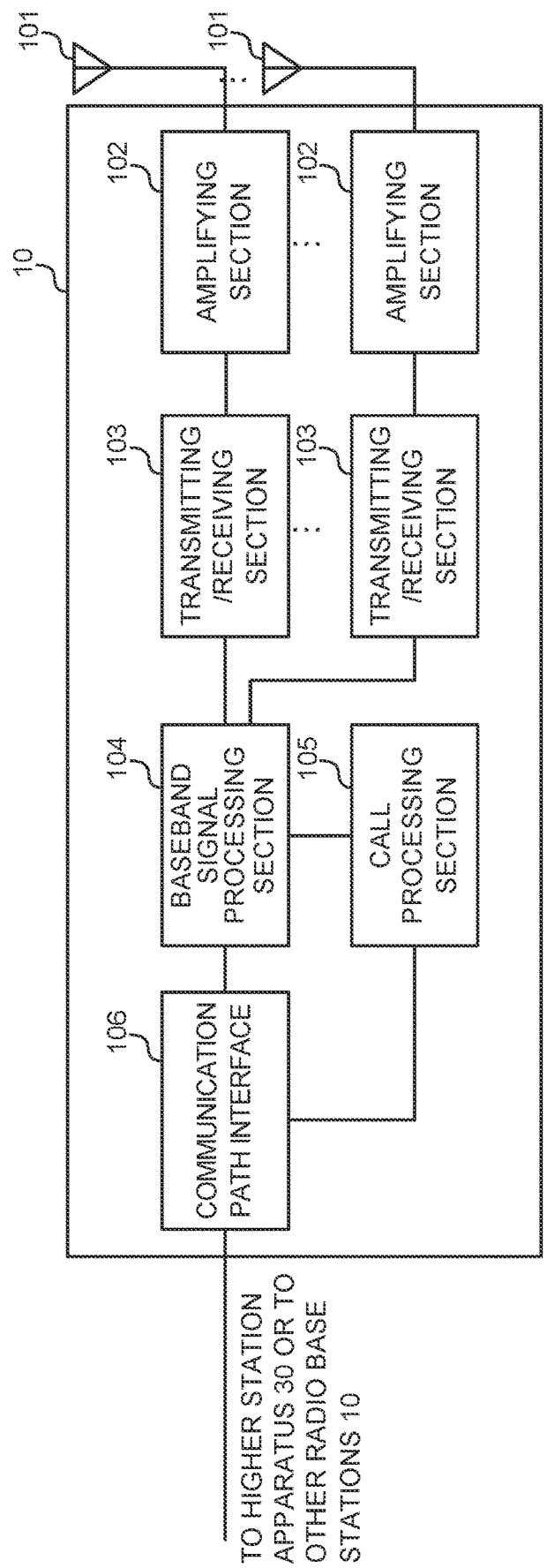
FIG. 6 is a diagram to show an example of an overall structure of a base station according to one embodiment.

FIG. 6 is a diagram to show an example of an overall structure of the base station according to one embodiment. A base station 10 includes a plurality of transmitting/receiving antennas 101, amplifying sections 102, transmitting/receiving sections 103, a baseband signal processing section 104, a call processing section 105 and a communication path interface 106. Note that the base station 10 may be configured to include one or more transmitting/receiving antennas 101, one or more amplifying sections 102 and one or more transmitting/receiving sections 103.

User data to be transmitted from the base station 10 to the user terminal 20 by the downlink is input from the higher station apparatus 30 to the baseband signal processing section 104, via the communication path interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the base station 10, manages the radio resources and so on.

The communication path interface 106 transmits and/or receives signals to and/or from the higher station apparatus 30 via a certain interface. The communication path interface 106 may transmit and/or receive signals (backhaul signaling) with other base stations 10 via an inter-base station interface (for example, an optical fiber in compliance with the CPRI (Common Public Radio Interface) and an X2 interface).

Figure 7:
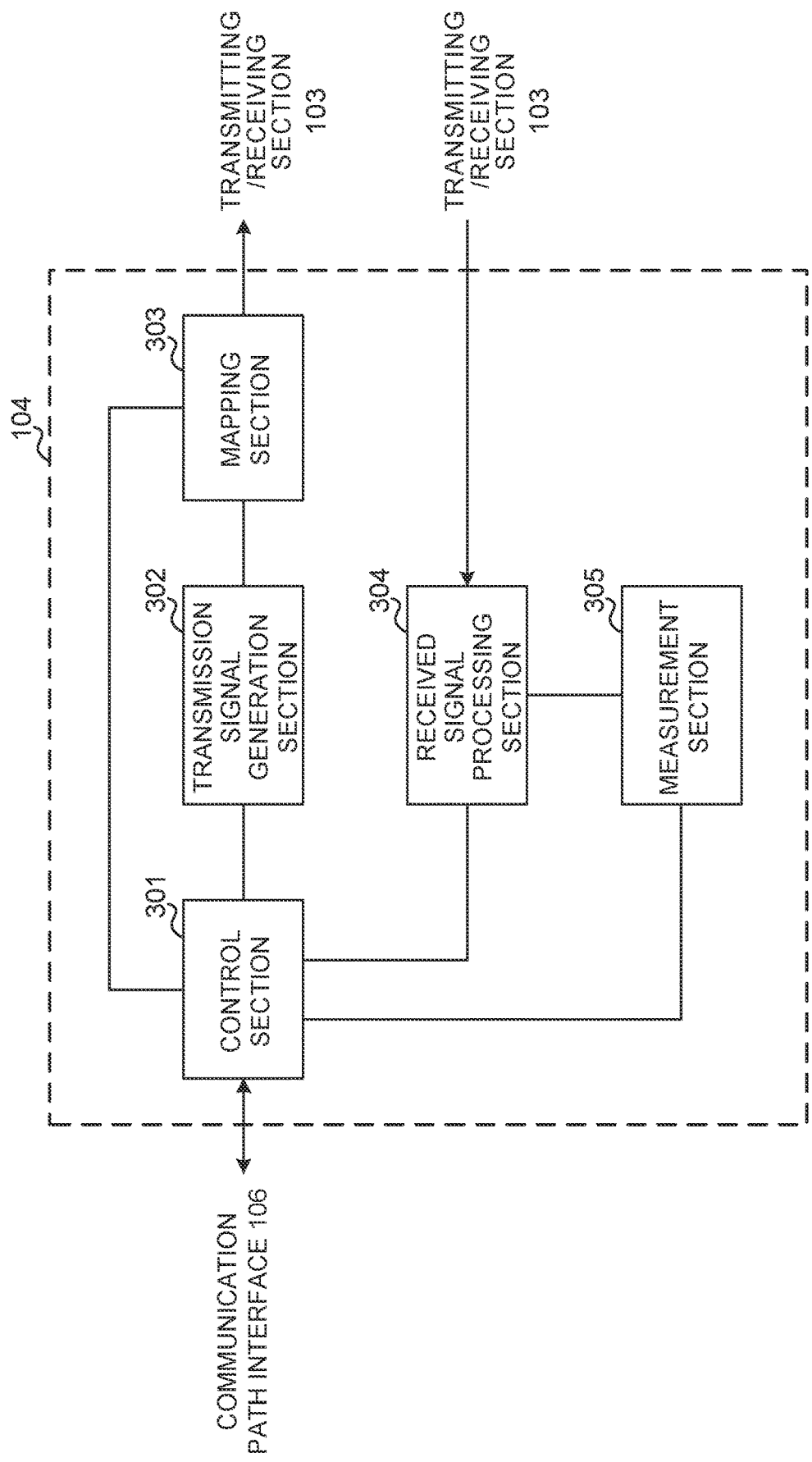
FIG. 7 is a diagram to show an example of a functional structure of the base station according to one embodiment.

FIG. 7 is a diagram to show an example of a functional structure of the base station according to one embodiment. Note that, the present example primarily shows functional blocks that pertain to characteristic parts of the present embodiment, and it is assumed that the base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the base station 10, and some or all of the structures do not need to be included in the baseband signal processing section 104.

The control section (scheduler) 301 controls the whole of the base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls scheduling (for example, resource allocation) of system information, a downlink data signal (for example, a signal transmitted by using a downlink shared channel), and a downlink control signal (for example, a signal transmitted by using a downlink control channel). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls scheduling of an uplink data signal (for example, a signal transmitted by using an uplink shared channel), an uplink control signal (for example, a signal transmitted by using an uplink control channel), a random access preamble, an uplink reference signal, and the like.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates at least one of DL assignment to report assignment information of downlink data and UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs at least one of the received signals and the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, CSI (Channel State Information) measurement, and so on, based on the received signal.

The measurement section 305 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 301.

Note that the transmitting/receiving section 103 may transmit the signal for beam measurement to the user terminal 20. The transmitting/receiving section 103 may receive, from the user terminal 20, a (periodic, semi-persistent, or aperiodic) beam report including information related to measurement results of the signal for beam measurement.

(User Terminal)

Figure 8:
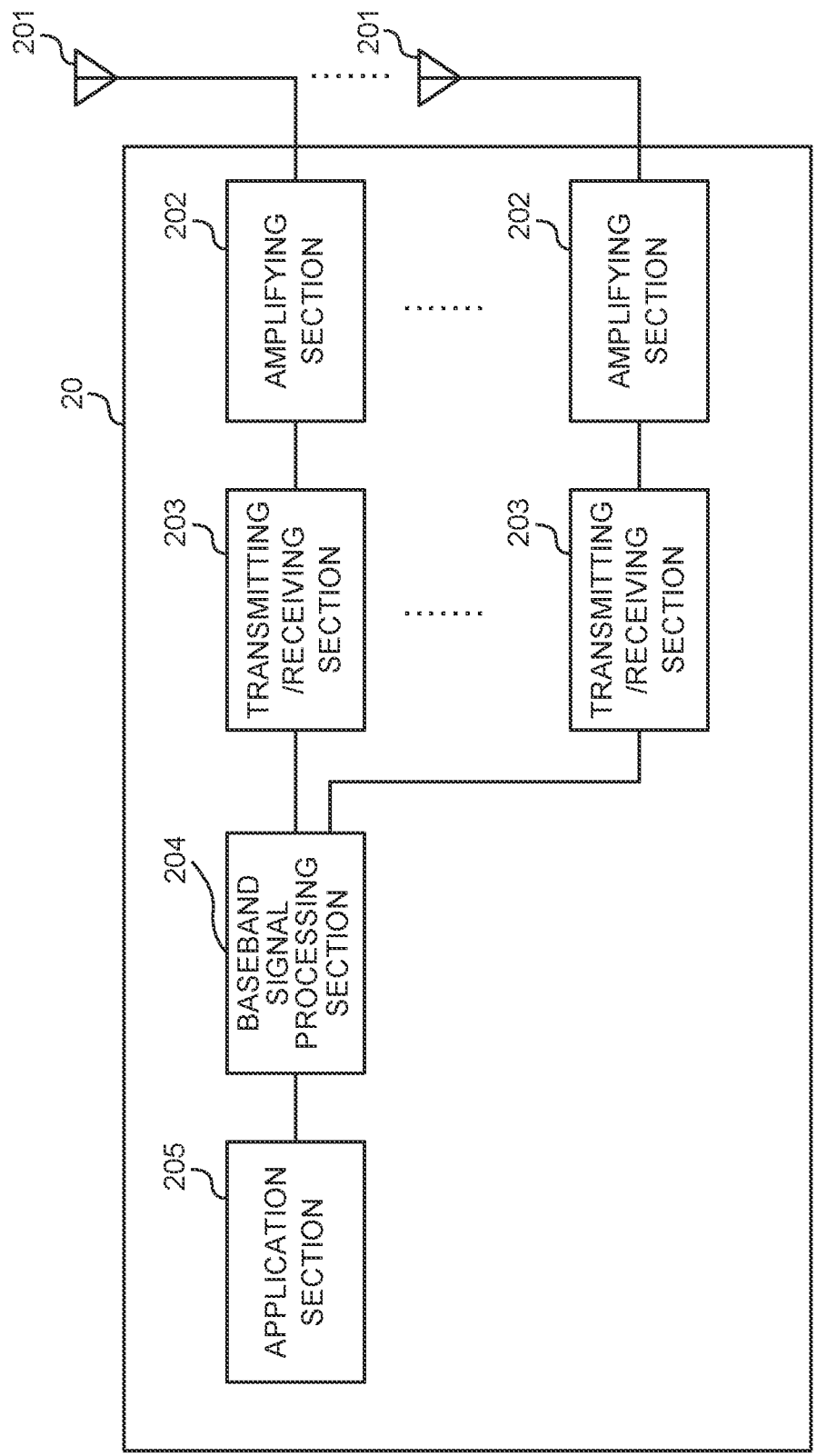
FIG. 8 is a diagram to show an example of an overall structure of a user terminal according to one embodiment.

FIG. 8 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Figure 9:
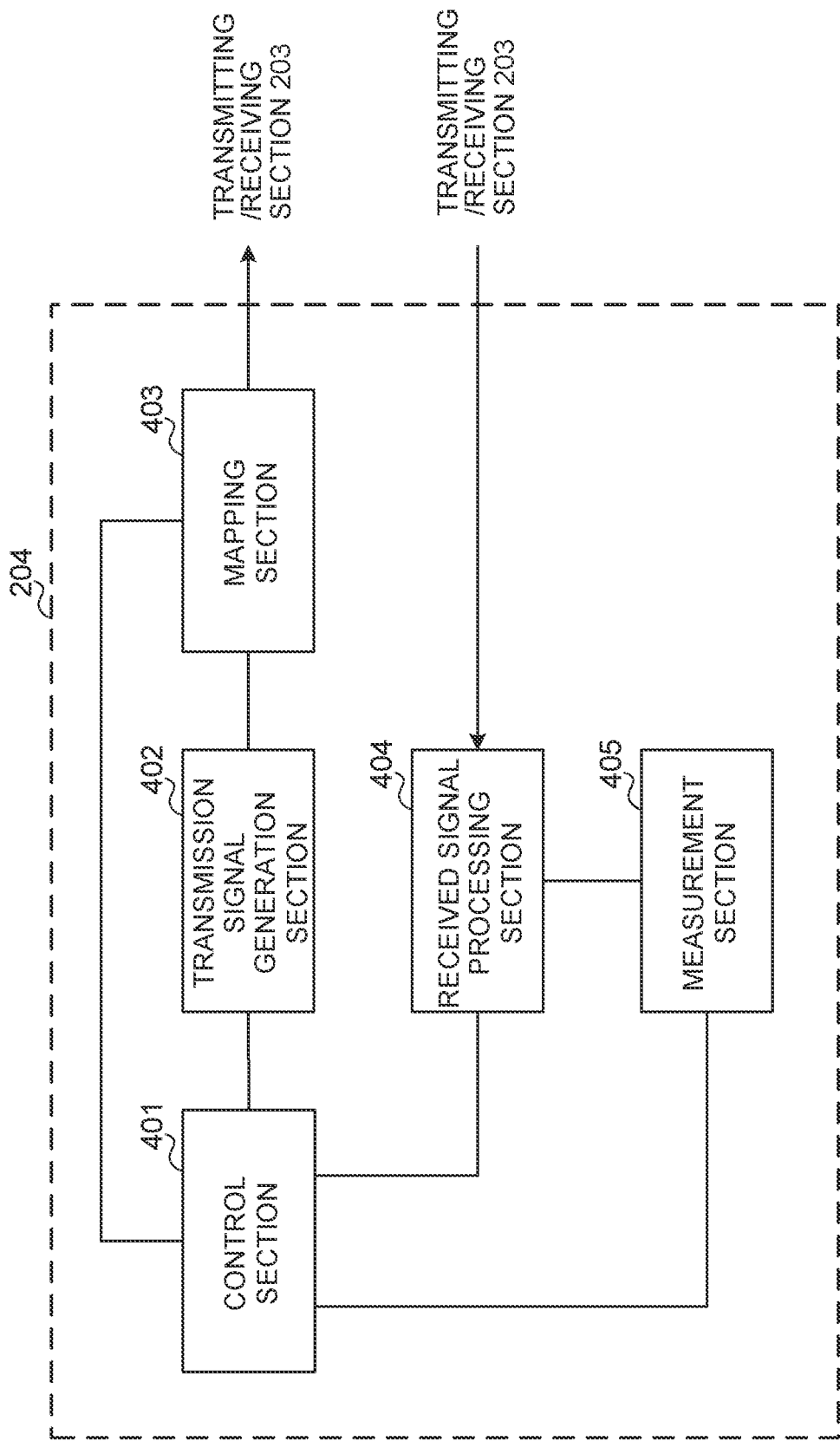
FIG. 9 is a diagram to show an example of a functional structure of the user terminal according to one embodiment.

FIG. 9 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal, a downlink data signal, and so on transmitted from the base station 10, from the received signal processing section 404. The control section 401 controls generation of an uplink control signal, an uplink data signal, and so on, based on results obtained as a result of determining whether or not retransmission control for the downlink data signal is required, the downlink control signal, and so on.

If the control section 401 acquires a variety of information reported by the base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs at least one of the received signals and the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present disclosure pertains. The measurement section 405 may configure at least a part of the receiving section according to the present disclosure.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

Note that the transmitting/receiving section 203 and the measurement section 405 may perform measurement based on the received signal for beam measurement. The transmitting/receiving section 203 may transmit, to the base station 10, a (periodic, semi-persistent, or aperiodic) beam report including information related to results of the measurement.

The transmitting/receiving section 203 may transmit capability information (UE capability signaling) indicating a first number (capability number) being equal to or greater than 1. The transmitting/receiving section 203 may receive configuration information (the higher layer parameter or the report RS number N) indicating a second number being equal to or greater than 1 and being equal to or less than the first number.

The control section 401 may perform a report of the measurement value of the second number being obtained by measurement of a reference signal associated with a beam.

The number of bits of the report of the best measurement value (measurement value of the best beam) when the second number is 1 and the number of bits of the report of the best measurement value when the second number is greater than 1 may be different from each other.

The transmitting/receiving section 203 may receive information (for example, the higher layer signaling) as to whether the number of bits of the report of the best measurement value when the second number is 1 and the number of bits of the report of the best measurement value when the second number is greater than 1 is different from each other.

A range of quantization of the best measurement value when the second number is 1 and a range of quantization of the best measurement value when the second number is greater than 1 may be different from each other.

A step size of quantization of the best measurement value when the second number is 1 and a step size of quantization of the best measurement value when the second number is greater than 1 may be different from each other.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software with the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but functions are by no means limited to these. For example, functional block (components) to implement a function of transmission may be referred to as a "transmitting section (transmitting unit)," a "transmitter," and the like. The method for implementing each component is not particularly limited as described above.

Figure 10:
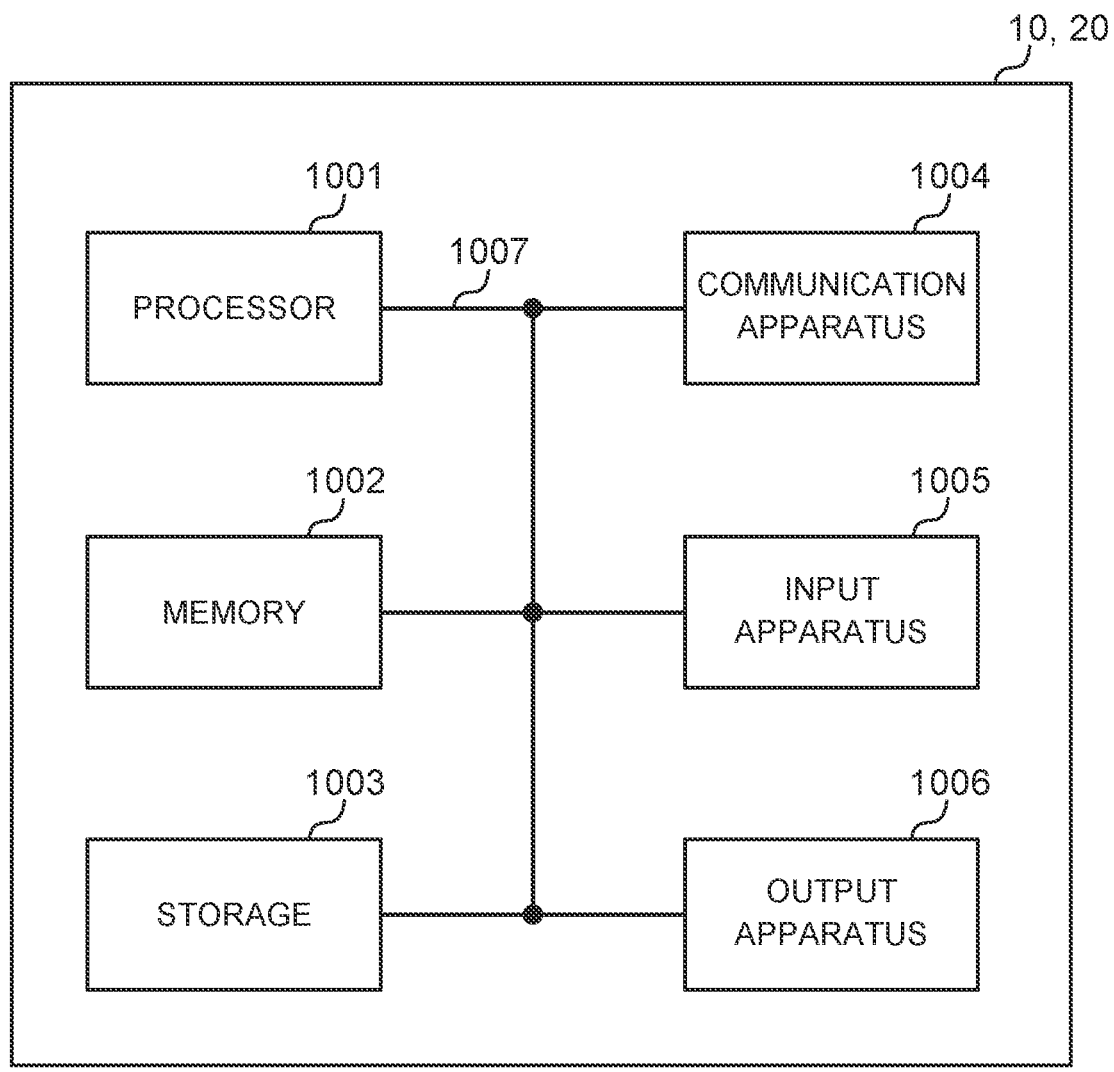
FIG. 10 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 10 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and so on may be implemented by the communication apparatus 1004. In the transmitting/receiving section 103, the transmitting section 103*a* and the receiving section 103*b* can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an ASIC (Application-Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be replaced by "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or the like, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (PRB (Physical RB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a BWP for the UL (UL BWP) and a BWP for the DL (DL BWP). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. Since various channels (PUCCH (Physical Uplink Control Channel), PDCCH (Physical Downlink Control Channel), and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

In the present disclosure, the terms such as "precoding," a "precoder," a "weight (precoding wait)," "quasi-co-location (QCL)," a "TCI state (Transmission Configuration Indication state)," a "spatial relation," a "spatial domain filter," a "transmit power," "phase rotation," an "antenna port," an "antenna port group," a "layer," "the number of layers," a "rank," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "communication apparatus," and so on. Note that at least one of a base station and a mobile station may be a device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an IoT (Internet of Things) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation.

The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods, next-generation systems that are enhanced based on these, and so on. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables, printed electrical connections, and so on, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B are each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a transmitter that transmits capability information indicating a maximum number of reference signals (RSs) to be reported, the maximum number being equal to or greater than 1;
    a receiver that receives configuration information indicating a report RS number being equal to or greater than 1 and being equal to or less than the maximum number; and
    a controller that performs, based on the configuration information, a report of Signal to Interference plus Noise Ratio (L1-SINR) that is obtained by measurement of RS,
    wherein when the report RS number indicated by the configuration information is greater than 1, the controller quantizes a largest measurement value of the L1-SINR to 7 bits and quantizes a differential L1-SINR to 4 bits.

2. A communication method for a terminal, the method comprising:
    transmitting capability information indicating a maximum number of reference signals (RSs) to be reported, the maximum number being equal to or greater than 1;
    receiving configuration information indicating a report RS number being equal to or greater than 1 and being equal to or less than the maximum number; and
    performing, based on the configuration information, a report of Signal to Interference plus Noise Ratio (L1-SINR) that is obtained by measurement of RS,
    wherein when the report RS number indicated by the configuration information is greater than 1, the terminal quantizes a largest measurement value of the L1-SINR to 7 bits and quantizes a differential L1-SINR to 4 bits.

3. A base station comprising:
    a receiver that receives, from a terminal, capability information indicating a maximum number of reference signals (RSs) to be reported, the maximum number being equal to or greater than 1;
    a transmitter that transmits configuration information indicating a report RS number being equal to or greater than 1 and being equal to or less than the maximum number; and
    a controller that receives, from the terminal, a report of Signal to Interference plus Noise Ratio (L1-SINR) that is obtained by measurement of RS according to the configuration information,
    wherein when the report RS number indicated by the configuration information is greater than 1, a largest measurement value of the L1-SINR is quantized to 7 bits and a differential L1-SINR is quantized to 4 bits.

4. A system comprising a terminal and a base station, wherein
    the terminal comprises:
        a transmitter that transmits capability information indicating a maximum number of reference signals (RSs) to be reported, the maximum number being equal to or greater than 1;
        a receiver that receives configuration information indicating a report RS number being equal to or greater than 1 and being equal to or less than the maximum number; and
        a controller that performs, based on the configuration information, a report of Signal to Interference plus Noise Ratio (L1-SINR) that is obtained by measurement of RS,
        wherein when the report RS number indicated by the configuration information is greater than 1, the controller quantizes a largest measurement value of the L1-SINR to 7 bits and quantizes a differential L1-SINR to 4 bits, and
    the base station comprises:
        a receiver that receives the capability information and the report; and
        a transmitter that transmits the configuration information to the terminal.

* * * * *